United States Patent
Roos

(10) Patent No.: US 7,486,782 B1
(45) Date of Patent: *Feb. 3, 2009

(54) MULTIFUNCTION DATA PORT PROVIDING AN INTERFACE BETWEEN A DIGITAL NETWORK AND ELECTRONICS IN RESIDENTIAL OR COMMERCIAL STRUCTURES

(76) Inventor: Charles E. Roos, 2507 Ridgewood Dr., Nashville, TN (US) 37215

( * ) Notice: Subject to any disclaimer, the term of this patent is extended or adjusted under 35 U.S.C. 154(b) by 527 days.

This patent is subject to a terminal disclaimer.

(21) Appl. No.: 09/667,408

(22) Filed: Sep. 21, 2000

Related U.S. Application Data

(63) Continuation-in-part of application No. 09/508,998, filed as application No. PCT/US97/16426 on Sep. 17, 1997, now abandoned.

(60) Provisional application No. 60/155,069, filed on Sep. 21, 1999.

(51) Int. Cl.
   *H04M 1/64* (2006.01)
   *G08C 19/16* (2006.01)
   *G06F 17/00* (2006.01)
   *G06F 15/16* (2006.01)
   *G01R 21/00* (2006.01)

(52) U.S. Cl. .......................... 379/106.03; 340/870.01; 340/870.07; 705/412; 705/40; 702/61; 709/250

(58) Field of Classification Search ............ 340/870.01, 340/870.02, 870.07; 379/106.01, 106.03; 705/26, 27, 400, 412, 413, 40; 709/250; 702/57–77

See application file for complete search history.

(56) References Cited

U.S. PATENT DOCUMENTS

| | | | |
|---|---|---|---|
| 4,133,034 A | 1/1979 | Etter | 364/464 |
| 4,174,517 A * | 11/1979 | Mandel | 340/310.02 |
| 4,200,862 A * | 4/1980 | Campbell et al. | 340/310.01 |
| 4,315,251 A | 2/1982 | Robinson et al. | 340/310 |
| 4,332,980 A * | 6/1982 | Reynolds et al. | 370/259 |
| 4,345,162 A * | 8/1982 | Hammer et al. | 307/39 |
| 4,378,524 A | 3/1983 | Steinmüller | 324/107 |
| 4,396,915 A | 8/1983 | Farnsworth et al. | 340/870.03 |
| 4,418,333 A * | 11/1983 | Schwarzbach et al. | 340/310.01 |
| 4,442,492 A * | 4/1984 | Karlsson et al. | 705/412 |

(Continued)

FOREIGN PATENT DOCUMENTS

AU   A-82700/91   *   3/1992

(Continued)

OTHER PUBLICATIONS

Todd Lappin, Wired, Aug. 1995, "Country Road Warrior", pp. 46 and 50.*

(Continued)

*Primary Examiner*—Igor N Borissov
(74) *Attorney, Agent, or Firm*—Morris & Foerster LLP

(57) ABSTRACT

A multifunction data port is located in or attached to the utility meter or the meter box. The installation or removal of the data port requires opening the meter seal. The data port interface can provide broad band access to a digital network and the Internet. It can provide the utility customer with a secure computer terminal for commerce and telecommunications. It can provide the electric utility load management and time of use metering of electrical power.

28 Claims, 12 Drawing Sheets

U.S. PATENT DOCUMENTS

| | | | | | |
|---|---|---|---|---|---|
| 4,455,453 | A | * | 6/1984 | Parasekvakos et al. | 379/106.06 |
| 4,475,076 | A | * | 10/1984 | Chernotsky et al. | 323/239 |
| 4,540,849 | A | * | 9/1985 | Oliver | 379/106.07 |
| 4,542,469 | A | | 9/1985 | Brandyberry et al. | 364/483 |
| 4,621,330 | A | | 11/1986 | Weikel | 364/483 |
| 4,639,728 | A | | 1/1987 | Swanson | 340/870.03 |
| 4,652,877 | A | | 3/1987 | Gray | 340/870.02 |
| 4,688,038 | A | | 8/1987 | Giammarese | 340/870.02 |
| 4,697,180 | A | | 9/1987 | Swanson | 340/870.02 |
| 4,697,182 | A | | 9/1987 | Swanson | 340/870.02 |
| 4,701,698 | A | | 10/1987 | Karlsson et al. | 324/116 |
| 4,782,341 | A | | 11/1988 | Gray | 340/870.02 |
| 4,803,632 | A | * | 2/1989 | Frew et al. | 705/412 |
| 4,804,957 | A | | 2/1989 | Selph et al. | 340/870.03 |
| 4,811,011 | A | | 3/1989 | Sollinger | 340/870.02 |
| 4,817,131 | A | | 3/1989 | Thornborough et al. | 379/107 |
| 4,866,761 | A | | 9/1989 | Thornborough et al. | 379/107 |
| 4,902,965 | A | | 2/1990 | Bodrug et al. | 324/116 |
| 4,904,995 | A | * | 2/1990 | Bonner et al. | 340/870.02 |
| 4,949,029 | A | | 8/1990 | Cooper et al. | 324/74 |
| 5,010,568 | A | | 4/1991 | Merriam et al. | 379/107 |
| 5,066,939 | A | * | 11/1991 | Mansfield, Jr. | 340/310.06 |
| 5,101,191 | A | * | 3/1992 | MacFadyen et al. | 340/310.01 |
| 5,111,407 | A | | 5/1992 | Galpern | 364/483 |
| 5,128,988 | A | | 7/1992 | Cowell et al. | 379/107 |
| 5,134,650 | A | | 7/1992 | Blackmon | 379/107 |
| 5,161,182 | A | | 11/1992 | Merriam et al. | 379/107 |
| 5,214,587 | A | * | 5/1993 | Green | 702/60 |
| 5,239,575 | A | | 8/1993 | White et al. | 379/107 |
| 5,283,572 | A | * | 2/1994 | McClelland et al. | 340/870.02 |
| 5,311,581 | A | | 5/1994 | Merriam et al. | 379/107 |
| 5,325,048 | A | | 6/1994 | Longini | 324/74 |
| 5,381,462 | A | | 1/1995 | Larson et al. | 379/107 |
| 5,404,136 | A | | 4/1995 | Marsden | 340/870.03 |
| 5,420,799 | A | | 5/1995 | Peterson et al. | 364/483 |
| 5,426,360 | A | | 6/1995 | Maraio et al. | 324/126 |
| 5,430,430 | A | * | 7/1995 | Gilbert | 340/310.01 |
| 5,434,911 | A | * | 7/1995 | Gray et al. | 379/106.06 |
| 5,454,031 | A | | 9/1995 | Gray et al. | 379/106 |
| 5,473,322 | A | | 12/1995 | Carney | 340/870.02 |
| 5,495,167 | A | | 2/1996 | Cotroneo | 324/74 |
| 5,495,238 | A | | 2/1996 | Baker et al. | 340/870.02 |
| 5,528,507 | A | * | 6/1996 | McNamara et al. | 700/286 |
| 5,530,738 | A | * | 6/1996 | McEachern | 379/88.16 |
| 5,544,036 | A | * | 8/1996 | Brown et al. | 340/825.24 |
| 5,546,318 | A | | 8/1996 | Lee, Jr. | 364/483 |
| 5,553,094 | A | * | 9/1996 | Johnson et al. | 375/130 |
| 5,559,870 | A | * | 9/1996 | Patton et al. | 379/106.03 |
| 5,559,894 | A | | 9/1996 | Lubliner et al. | 382/100 |
| 5,572,438 | A | * | 11/1996 | Ehlers et al. | 700/295 |
| 5,635,895 | A | * | 6/1997 | Murr | 340/310.01 |
| 5,664,202 | A | | 9/1997 | Chen et al. | 395/750.08 |
| 5,675,754 | A | | 10/1997 | King et al. | 395/333 |
| 5,684,710 | A | | 11/1997 | Ehlers et al. | 364/492 |
| 5,696,695 | A | | 12/1997 | Ehlers et al. | 364/492 |
| 5,699,276 | A | * | 12/1997 | Roos | 379/106.03 |
| 5,719,564 | A | | 2/1998 | Sears | 340/870.02 |
| 5,745,114 | A | * | 4/1998 | King et al. | 715/810 |
| 5,751,797 | A | | 5/1998 | Saadeh | 379/106.03 |
| 5,764,523 | A | | 6/1998 | Yoshinaga et al. | 364/483 |
| 5,764,739 | A | * | 6/1998 | Patton et al. | 379/106.03 |
| 5,816,491 | A | * | 10/1998 | Berkeley et al. | 236/46 R |
| 5,898,387 | A | * | 4/1999 | Davis et al. | 340/870.02 |
| 5,940,009 | A | * | 8/1999 | Loy et al. | 340/870.02 |
| 6,040,759 | A | * | 3/2000 | Sanderson | 340/310.01 |
| 6,150,955 | A | * | 11/2000 | Tracy et al. | 340/870.02 |
| 2002/0145509 | A1 | * | 10/2002 | Karny et al. | 340/310.06 |
| 2003/0167178 | A1 | * | 9/2003 | Jarman et al. | 705/1 |

FOREIGN PATENT DOCUMENTS

| | | | |
|---|---|---|---|
| EP | 0795948 A1 | * | 9/1997 |
| GB | 2297663 A | * | 8/1996 |
| WO | WO 97/09800 A2 | * | 3/1997 |

OTHER PUBLICATIONS

Ross Kerber, The Wall Street Journal, Marketplace, Jan. 27, 1997, "Utilities Reach Out to Add Phone, Cable Service", pp. B1 and B10.*

Nancy Salucci, snowcrest.net/iums/index html, Jun. 10, 1996, revised Sep. 1996, "Utility Systems Corporation Intelligent Utility Meter System (IUMS)", 9 pages printed from web site.* at.com/pres/0297970225.pca.html, Feb. 25, 1997, "AT&T's breakthrough wireless technology new alternative for local service" 5 pages printed from web site.*

San Francisco Chronicle, Business, Feb. 21, 1996, "HP Joining With CellNet to Automate Utilities".*

Electric Light & Power, Mar. 1996, vol. 74, No. 3, "Telecom bill swings door wide with open for utilities".*

Electric Light & Power, Mar. 1996, vol. 74, No. 3, "IOUs welcome telecommunications reform".*

CableBus Systems Corporation, Production Guide '95, Broadband Modems for Meter Readings, Load Control, Cable Security, Home Messaging, Traffic Light & Water Control Systems, Portland OR.*

Cavanaugh: "Information superhighways are under construction at many electric utilities"; Electic World, Feb. 1994, vol. 208, No. 2, p. 5.*

* cited by examiner

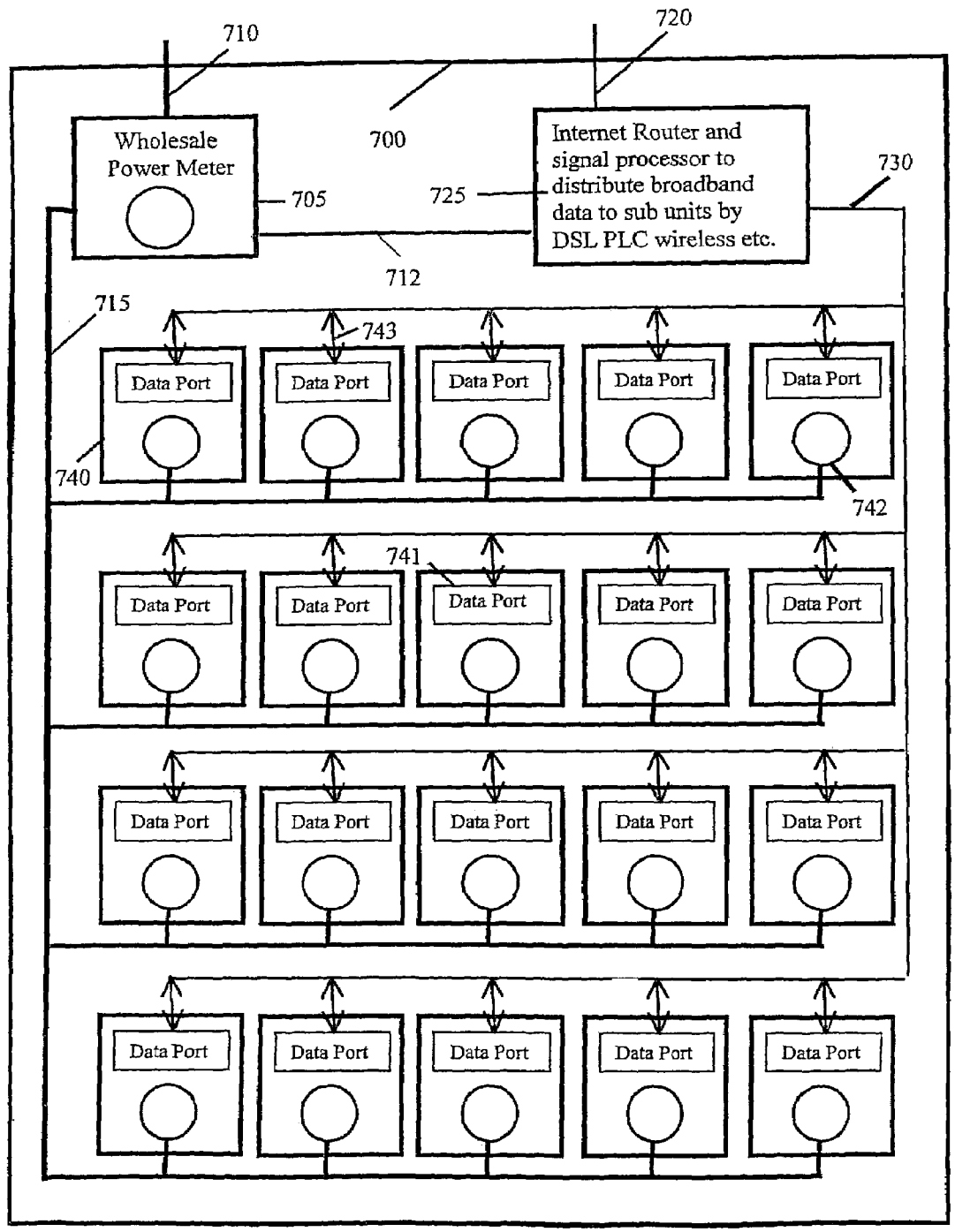

MULTIFUNCTION DATA PORT PROVIDING AN INTERFACE BETWEEN A DIGITAL NETWORK AND ELECTRONICS IN RESIDENTIAL OR COMMERCIAL STRUCTURES

RELATED APPLICATIONS

The present application is a continuation-in-part of U.S. national phase patent application Ser. No. 09/508,998, filed May 18, 2000, now abandoned based on international application number PCT/US97/16426, filed Sep. 17, 1997, from which priority is claimed; and a continuation-in-part of U.S. provisional patent application Ser. No. 60/155,069, filed Sep. 21, 1999, from which priority is claimed.

BACKGROUND OF THE INVENTION

1. Field of the Invention

The invention is related to a data port and, more particularly, to a multifunction intelligent data port having a computer interface between a digital service network and a utility user's home electronics. The invention further relates to remote utility meter reading and remote load management.

2. Related Art

A customer of an electric company typically has an electric meter located at the customer's structure or site of distribution of electrical power. The customer's structure may be, for example, the customer's home or office. The electric meter is owned by the electric company and is installed in a meter box, which holds the electric meter. The meter box may be provided and owned by the building owner, the utility or the landlord.

The prior art includes a number of references that disclose utility meters with associated electronics.

U.S. Pat. No. 4,455,453 issued to Parasekvakos et al., incorporated herein by reference, discloses an apparatus for remote meter reading, wherein a remote unit, preferably located inside a house, periodically initiates a telephone call to a utility company and communicates power usage information.

U.S. Pat. No. 4,803,632 issued to Frew et al., incorporated herein by reference, discloses a utility meter having a CPU, a display, and associated circuitry which may be located in the conventional meter location. Frew also discloses a remote unit located inside the house which displays the meter information and allows the customer to pay his bill by credit card. The remote unit communicates with the CPU over the house's power lines. The meter in Frew can be read by a meter reader either through the house's power lines or via optical coupling at the meter.

U.S. Pat. No. 4,804,957 issued to Selph et al, incorporated herein by reference, discloses a utility meter using a microprocessor-based circuit and Hall effect current sensors to measure power usage. In Selph, the meter may be read by either remote interrogation via a telephone link or serial communication. Selph also discloses a networked submetering arrangement useful in apartment buildings and the like.

U.S. Pat. No. 4,904,995 issued to Bonner et al., incorporated herein by reference, discloses a remote meter reading apparatus which is designed to retrofit existing electric meters with a transponder capable of communicating power usage information to the electric company over the electric power distribution system.

It is also known in the art to utilize a house's power lines for communication between a variety of devices.

U.S. Pat. No. 4,174,517 issued to Mandel, incorporated herein by reference, discloses a central system for controlling remote devices over a house's power line. A central control unit is plugged into a wall outlet for communicating over the power lines with remote units which are also plugged into wall outlets.

U.S. Pat. No. 4,200,862 issued to Campbell et al., incorporated herein by reference, discloses an appliance control system wherein a data transmitter communicates with slave units over a house's power lines by using digital address and operation signals. In Campbell, the data transmitter and various slave units are plugged into wall outlets.

U.S. Pat. No. 5,066,939 issued to Mansfield, Jr., incorporated herein by reference, discloses a circuit for communicating over a house's power lines in which extension telephones are connected to a conventional electrical wall outlet. A master station connector is plugged into a wall outlet and is also connected to the telephone line to facilitate full duplex communication between the extension telephones and the house's telephone line.

It is further known in the art to provide digital network services to a house. U.S. Pat. No. 4,332,980 issued to Reynolds et al., incorporated herein by reference, discloses a multiple service system which delivers a variety of services to a subscriber over telephone lines. The services disclosed in Reynolds include remote meter reading and load management. In Reynolds, a subscriber data subsystem is placed in the subscriber's house and communicates with peripheral devices over a subscriber data bus. The subscriber data bus is accessed via dedicated wiring and separate data service wall jacks.

U.S. Pat. No. 5,101,191 issued to MacFayden et al., incorporated herein by reference, discloses a house wiring arrangement for controlling the distribution of energy and communications within a house. MacFayden provides a gateway terminal as an interface for communicating outside the house over the public telephone network or power lines.

An article entitled "Country Road Warrior" and written by Todd Lappin, published in the August 1995 issue of WIRED on pages 46 and 50, incorporated herein by reference, discloses an electric company which provides digital network services to its customers using conventional communication technology over a coaxial cable network. The network was installed for remote meter reading and later adapted to deliver high-bandwidth data services.

None of the prior art discloses a utility meter or data port which provides an interface between a digital service network and home electronics.

In Parasekvakos, Frew, Selph, and Bonner, the electronics associated with the utility meter are directed primarily to meter reading functions.

In Mandell, Campbell, and Mansfield, communication over the power lines is directed primarily to communication with devices within the house. Also, in Mandell, Campbell, and Mansfield, a separate "master" unit must be located inside the house and plugged into a wall outlet.

In both Reynolds and MacFayden, a house must be wired with a special wiring configuration to accommodate the specific bus structures and communication methods disclosed. Reynolds and MacFayden also require some type of interface unit located inside the house. The network described by the Lappin article does not use a computer in the meter as an interface with the digital network, but rather requires installation of a special jack for connection to the network.

SUMMARY OF THE INVENTION

It is an object of the present invention to overcome the above and other disadvantages in the prior art. Specifically, it is an object of the invention to provide a data port with associated electronics to perform functions beyond meter reading, including functions such as providing an interface between a digital services network and home electronics.

It is an object of the invention to provide a digital service network interface which is not located inside the house and does not plug into a wall outlet.

It is an object of the invention to provide digital data services into a house without rewiring the house and without requiring special wiring.

It is an object of the invention to provide conventional meter capabilities in conjunction with associated electronics and broadband access to digital networks.

It is an object of the invention to provide a multifunction data port device in a secure sealed location where installation or removal requires breaking the utility's meter seal.

Yet another object of the invention is to provide a data port which provides a secure banking and Internet browsing capability.

The above and other objects of the invention are accomplished by a data port having a standard electric power meter and associated electronics within a meter enclosure and having a standard base suitable for mating with a standard meter box. The associated electronics include a computer having a network interface and a house interface.

The computer may include a video processor and/or descrambler for television services, a modem processor for data services, and a voice processor for telephone services. The computer may also include a meter interface for remote meter reading. The meter interface may be coupled to a circuit breaker box equipped with triacs or solid state switches for load management. The computer may further include a personal computer (PC) interface coupled to the other various processors and interfaces.

The network interface may be coupled to a digital service network, which communicates, for example, via satellite, wireless communication, fiber optic cables, coaxial cables, or twisted pair telephone lines. The house interface may be coupled to the house's internal wiring including the house's power lines, telephone lines and television coaxial cables. The house interface may communicate with home electronics via wireless communication through, for example, short range microwave signals such as those used by cordless telephones. The network interface may be directly coupled to the house interface and/or coupled through the various other processors and interfaces.

Additional objects and advantages of the invention will be set forth in the description, which follows, and in part will be obvious from the description, or may be learned by practice of the invention. The objects and advantages of the invention may be realized and obtained by means of the instrumentality and combinations particularly pointed out in the appended claims.

BRIEF DESCRIPTION OF THE DRAWINGS

The accompanying drawings, which are incorporated in and constitute a part of the specification, illustrate presently preferred exemplary embodiments of the invention, and, together with the general description given above and the detailed description of the preferred embodiments given below, serve to explain the principles of the invention.

FIG. 7 shows an embodiment of a system for the distribution of broadband communication and electrical power to multifamily living units and commercial buildings with the multifunction data port.

DETAILED DESCRIPTION OF THE PREFERRED EMBODIMENTS

Figure 1:
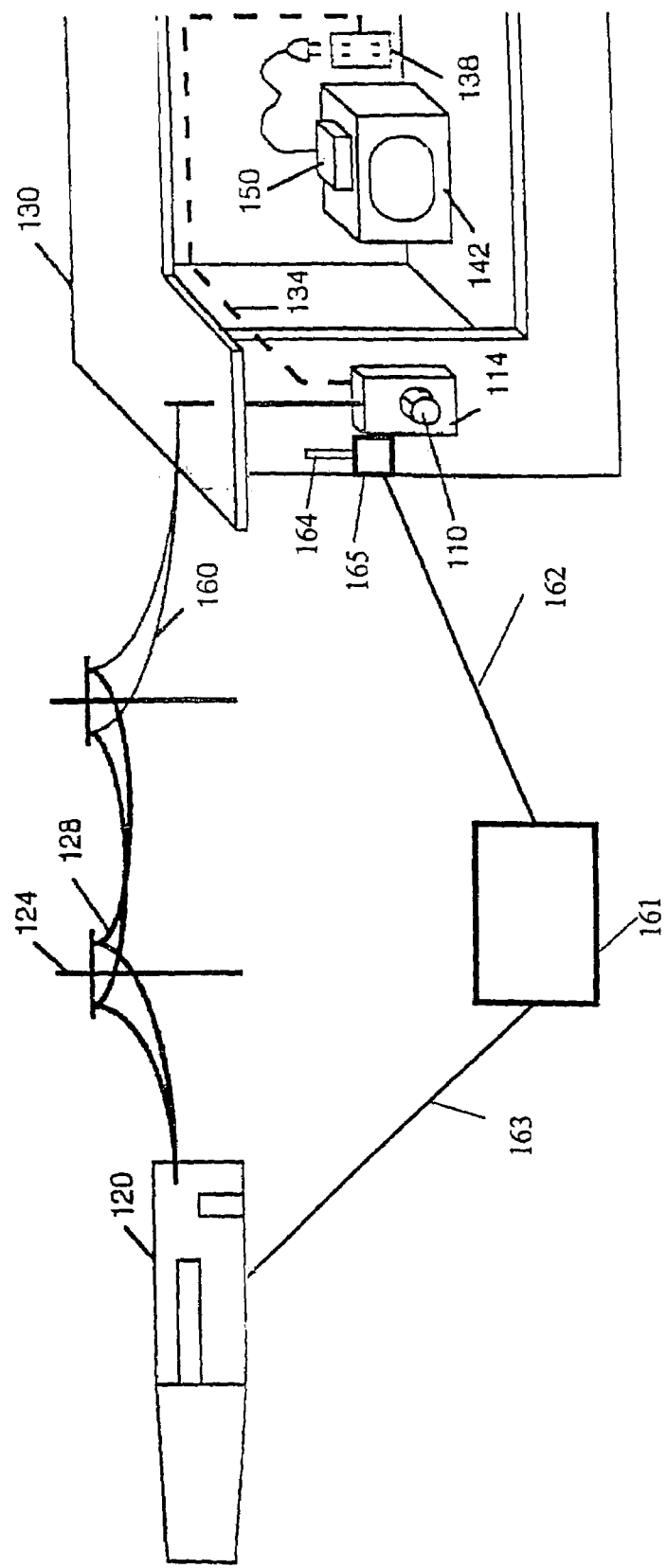
FIG. 1 shows a perspective view of a first embodiment of an electric meter according to the invention which provides an interface between an electric company and a house.

FIG. 1 shows a first embodiment of an electric meter 110 according to the invention mated to a standard meter box 114. An electric company 120 provides electrical service to a house 130 over external power lines 128 suspended by utility poles 124. Alternatively, the electric company 120 may provide electrical service to the house 130 via power lines buried under the ground.

According to the invention, electric company 120 provides a digital service network over a network communication line 160, which may be, for example, fiber optic cable, coaxial cable or twisted pair cable. The electric meter 110 provides an interface between the digital service network and the internal house wiring 134. Internal house wiring 134 may include, for example, power lines, telephone lines, and television coaxial cables. A device 150 can plug into a wall outlet 138 to access the digital service network. Device 150 may, for example, provide video signals to television 142.

As previously discussed, the electric meter 110 is owned by the electric company 120 and is installed in the meter box 114 which is provided by the building owner or by the utility. The electric meter 110 according to the invention includes the addition of a video connection and various computer electronics and switches. The electric meter 110 also continues to measure power consumption by standard means. The addition of the computer and video connection greatly extends the capacities of the meter and it permits the electric company to provide, for example, both video and telephone communication in additional to electrical service.

The computer in the electric meter 110 according to the invention may also provide remote readings and load control, interactive communication, and a household computer at very little extra cost. The placement of the computer in the electric meter 110 is advantageous because the electric company can justify the costs of the modified meter to a regulatory agency on the basis of remote meter readings, load control, and customer billing and communication at times of power outages and other emergencies. The electric meter 110 according to the invention can be quickly exchanged and installed in the sealed meter box. The invention thus permits a regulated electric utility to have an unregulated subsidiary that can deliver broadband access to digital and analog data and that can be in the telephone, video or multimedia business.

Further advantages may be realized because many electric companies already run fiber optic or coaxial cables to their major switching stations. Typically, utility companies have easements and own the utility poles. Therefore the electric company can easily extend these cables to each household.

The electric utility also has the option to work with a television cable company to use the cable company's previously existing coaxial lines. For example, the previously-existing coaxial cable may be run directly to the electric meter 110 according to the invention and thereafter supplied to the house. Alternatively, the coaxial cable may be tapped or spliced using a "T" connector or the like. Either of these configurations is advantageous because the electric meter 110 may be installed and attached to existing coaxial cables quickly without access to the internal wiring of the house. The utility may be in a good position to negotiate with the cable company because it has the alternative of running its own coaxial cable and competing directly, like the electric company in the Lappin article.

Figure 2:
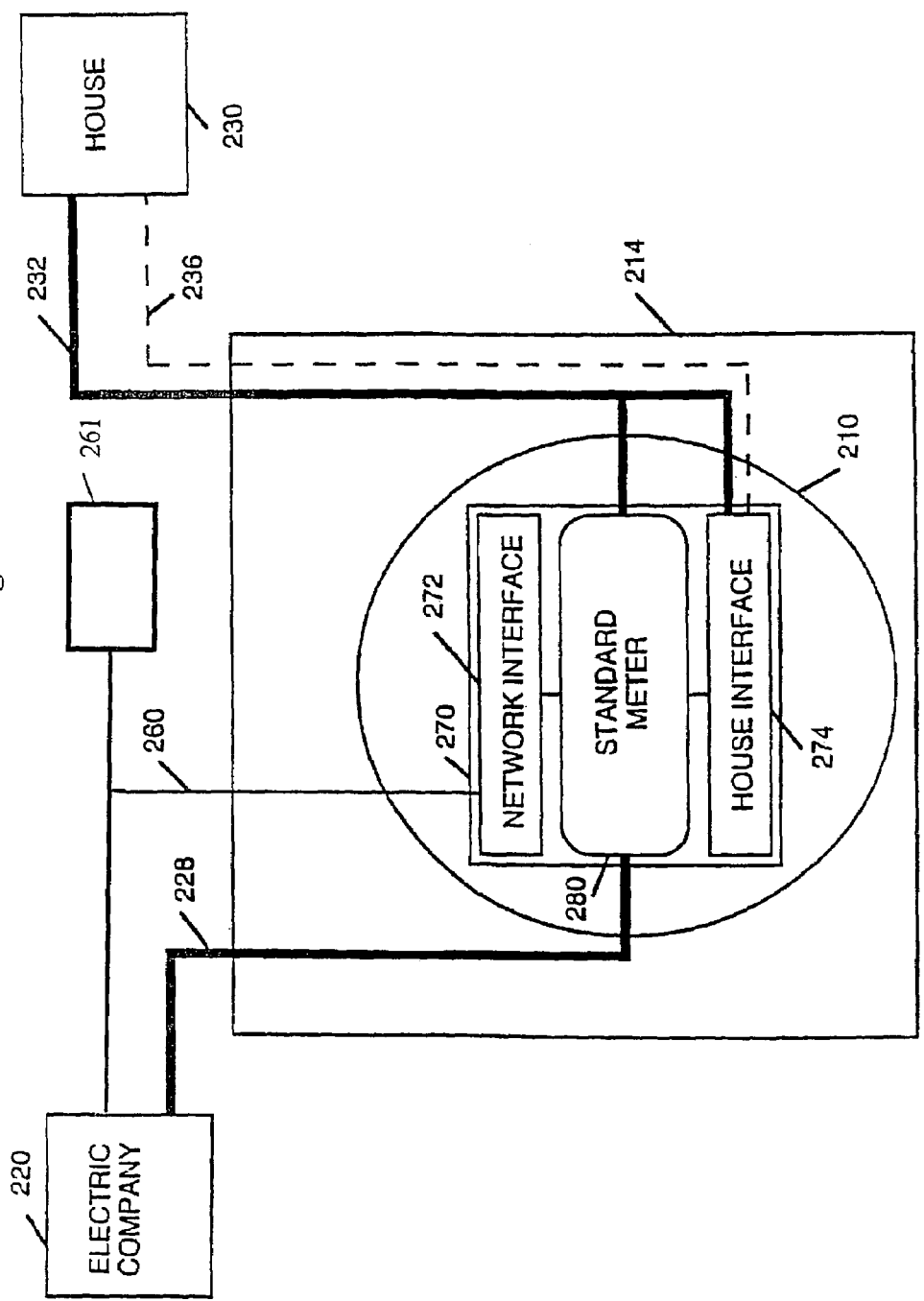
FIG. 2 shows a block diagram of a second embodiment of an electric meter according to the invention which provides an interface between an electric company and a house.

FIG. 2 shows a block diagram of second embodiment of an electric meter 210 according to the invention providing an interface between an electric company 220 which provides a digital service network over network communication line 260 and a house 230. The gateway meter 210 is coupled to the sealed meter box 214 and has a computer 270. Computer 270 is connected to network communication line 260 through a network interface 272. Computer 270 also includes a house interface 274 and a standard electric power meter 280, both of which are coupled with network interface 272. Network interface 272 and house interface 274 may comprise signal-processing computers.

Electric company 220 supplies electrical power over external power lines 228 which are connected to standard electric power meter 280 and house's internal power lines 232. House interface 274 is also coupled to house's internal power lines 232 for communication thereon. House interface 274 is further optionally coupled to the house's other internal wiring 236. The house interface 274 is directly connected to the internal power line 232 and may communicate with devices such as those described in the prior art references. The house interface 274 may also transmit and receive telephone and computer signals over the internal power lines 232 and the network interface 272 may receive and transmit these signals over the network communication line 260. This configuration puts the digital service network in communication with home electronics over the network communication line 260.

The electric utility may, for example, compete with a local telephone company by providing a telephone device adapted to communicate over the internal power line 232 to the house interface 274 and through the network interface 274 to a digital switching service. Thus, the voice processor 390 may be a commercially available voice processor adapted for transmitting and receiving analog or digital voice information directly over the house internal power lines 332. The electric company could further provide a direct connection to various long distance companies. The electric utility also has the option to contract with the local phone companies and makes use of their existing switching systems.

In another example, network interface 272 may function as a computer switch and Internet router and communication line 260 may comprise a fiber optic cable. A computer switch operating in conjunction with a fiber optic connection to a digital service network can receive several hundred channels of information, and also function as a data port for broadband data transmission. House interface 274 may be in communication with a home electronic device, Such as a video monitor, and may, in response to a request from the home electronic device, function to select a desired channel for transmission over the internal power lines 232 and/or other internal wiring 236 to the home electronic device. Network interface 272 may be further operative to descramble signals, function as a firewall, and provide billing information. Because of the ease of installing an electric meter according to the invention and the simplicity of the interfaces, the addition of such a fiber optic connection to a digital service network is relatively inexpensive.

The meter box 214 is typically located at a junction of the internal telephone lines, television coaxial cables and power lines, all of which belong to the house owner. An electric meter 210 according to the invention, by being installed in the sealed meter box 214, puts the electric company 220 in an advantageous position to control the flow of multimedia information. Because of the advantageous location, the invention provides convenient access to the building.

The electric company can also provide the house owner a unique advantage by integrating the various functions described herein into the electric meter according to the invention. Because the electric company owns and can replace the previously-existing electric meter with an electric meter according to the invention, the invention eliminates the need for any installation on the part of the customer. The invention is advantageous even in new construction situations, because no additional installation is required. The invention provides a further advantage by not requiring a dedicated wall outlet or special wiring to provide access to a digital service network.

Figure 3:
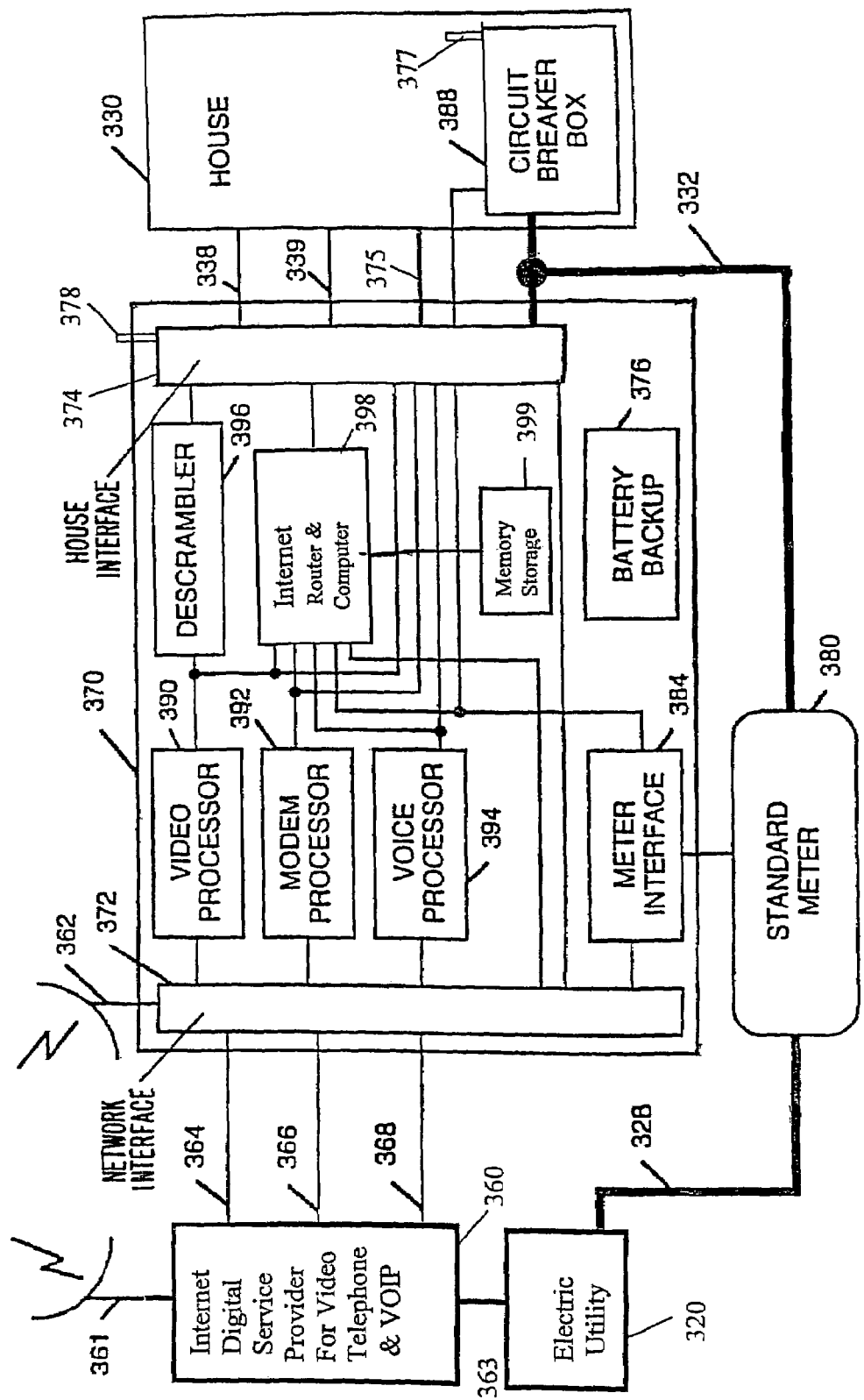
FIG. 3 shows a block diagram of a third embodiment of an electric meter according to the invention which provides an interface between an electric company and a house.

FIG. 3 shows a third embodiment of associated electronics for an electric meter according to the invention with a detailed block diagram of a signal processing computer 370 which provides an interface between an electric company 320 and a house 330. The computer 370 is located in the electric meter (not shown). The electric company 320 provides digital data services via network wireless transmission device 361 and over fiber optic cables 364, coaxial cables 366, and twisted pair cables 368, or directly over power lines 328. The computer 370 is coupled to the digital data services through network interface 372.

Network interface 372 provides a remote wireless transmission device 362 to communicate with network wireless transmission 361. Such communication might include transmitting and receiving signals over a selected microwave frequency channel. Data transmission on the selected frequency channel might include such techniques as token ring data transmission, spread spectrum transmission, and/or packet data transmission. Alternatively, wireless transmission media might include infrared, optical, cellular, or satellite communications.

Computer 370 provides a video processor 390, a modem processor 392, a voice processor 394, and a meter interface 384, all of which are coupled to network interface 372, house interface 374, and PC interface 398 for both receiving and transmitting their respective signals. The PC interface is preferably a microprocessor chip set including a CPU and RAM (not shown). Computer 370 also provides a battery backup 376 to supply power to computer 370 in the event of a power failure, and a hard disk drive 399 or alternative storage device under control of controller 391.

Computer 370 may be operative upon occurrence of such an event to notify electric company 320 of the position of the power failure. Likewise, the computer 370 may store customer service messages from the power company on hard drive or memory storage device 399. In the case of a power outage as detected by the meter 380, the controller 391 could be instructed by the PC interface 398 to retrieve a customer service messages from drive 391 and use it to telephone and reassure the customer that the utility is aware and is working to solve the problem. Typically, the utility customer service telephone lines are overloaded at times of power problems and the recorded message should help to reduce the number of telephone calls.

Video processor 390 is further coupled to descrambler 396 for providing de-scrambled video signals to house interface 374. For example, the video processor 390 may be an a commercially available MPEG-2 decoder chip, with both audio and vide decoding capability. Alternatively, multi-chip or software MPEG-2 decoders can be employed, or decoders based on other audiovisual standards, such as motion JPEG, MPEG-1, MPEG-4, H.261 or H.263.

The hard drive 399 may also be written with educational or commercial materials previously requested by the customer via messages received by modem processor 392 at times when there is little demand for telephone usage. Such capability allows the customer fast access to materials on the drive without the need for high-speed broadband access. This, a full feature movie or other lengthy audiovisual materials could be ordered in the evening by a consumer for delivery the following morning during off-peak hours.

The network interface is coupled to PC interface 398. The network interface 372 is further coupled directly to house interface 374 for passing signals through without other processing.

House interface 374 is coupled to house's internal wiring including house's internal power lines 332, telephone lines 338, and television coaxial cables 339. The house interface 374 may also communicate with home electronics via wireless communication. For example, cordless telephones communicate over short range microwave signals. The house interface 374 may utilize similar short-range wireless communication.

PC interface 398 is coupled to house interface 374 for providing personal computer functions to users in house 330. Personal computer peripherals which require user access, such as floppy disk drives, audio speakers, and CD ROM drives, may be provided inside the house 330 and communicate with the PC interface 398 through the house interface 374. Thus, the data port according to the invention may be used as an Internet router, incorporating all the functions of a personal computer configured for Internet browsing.

Electric company 320 provides electrical power service over external power lines 328. External power lines 328 enter the meter box 370 to which meter 380 is sealed and then into the house 330 via power lines 332 to circuit breaker box 388. Meter interface 384 is attached or in the power meter 380 and/or meter box 370 and it is electrically connected via power lines 332 to circuit breaker box 388. Circuit breaker box 388 passes electrical power service to house over the house's internal power lines (not shown).

The embodiment shown in FIG. 3 is advantageous with respect to power management. For example, the electric company 320 may obtain a time of use record of both power use and power factor by communicating periodically with meter interface 384.

Alternatively, the device may be employed to change thermostat settings for air conditioning, heat and hot water functions in the house 330 as a function of changes in the cost and/or availability of electric power. In order to effect such changes, the utility would transmit to the device the current cost of power, which would then be compared to predetermined thresholds set by the home owner by the PC interface 398. The house owner can thus select a range of electrical services based on cost.

In addition to reduction in costs for meter reading, the third embodiment may detect tampering or attempts at bypassing the meter. Likewise, a global positioning satellite may be employed to monitor the position of the meter via wireless transmission device 362 to detect movement of the device and the location of the device.

The electric meter according to the invention can also notify the utility when there is a power outage. Another example is advantageous billing arrangements. If there was a problem with the customer's payments, the electric company 320 could instruct the computer 370 to notify the customer through, for example, a message on the customer's television or by email over the internet or any digital network as the invention prescribes.

Regarding load management, the use of triacs or other solid state switches (not shown) in circuit breaker box 388 enables the electric company 320 to selectively turn on and off the power remotely to specific circuits. For example, the electric company 320 might turn off hot water heater circuits during excess power demands. In another example, the triacs can be used to reduce the voltage if the power company has excess power demands. Triacs or other remotely controlled switches could also be used to remotely shut off power if there is evidence of meter tampering, unpaid power bills or a change in the account, such as a request for disconnect.

The electric meter according to the invention also provides advantages for the customer's own energy management. The customer can use the electric meter according to the invention to change the thermostat settings for air conditioning and the hot water heater and to control the use of appliances. This system will permit the customer to enjoy reduced rates by, for example, running the dishwasher and hot water heater at the times of lowest power demands and reducing the air conditioning load at times of peak demand. The interaction of the TV and internal power lines advantageously permits the power user to control their power use with the TV as a monitor. For example, the electric meter according to the invention can be programmed to give different customers an individual choice of lower power rates by controlling the timing of different loads or higher rates with unrestricted use of power.

The electric meter according to the invention also advantageously provides each household with a personal computer, which can use a TV as a monitor. The electric company may supply or rent software for the personal computer over the digital service network.

For example, the electric company might provide a "free" service for school children to use for their homework. This has the advantage of getting children used to using the software made available by the electric company. The electric meter according to the invention might also utilize the personal computer to provide access to the Internet and for financial transactions. The electric company can also provide programming to make it very easy for the consumer to pay their power bills each month.

A regulated utility, like an electric company, can justify the costs of the electric meter according to the invention because it will reduce the costs to read meters, provide better communication between the utility and its customers and it will provide significant help in power management. The unregulated portion of the electric company can obtain revenues from electronic communications. Recent legislation has reduced regulation in communications and this opens the field for the electric company, which is already connected to every house. The electric meter according to the invention will enable the electric company to be competition for both the telephone and television cable companies and provides a strong incentive for these companies to work with the electric company by supplying a digital service network over existing telephone and television lines.

Figure 4A:
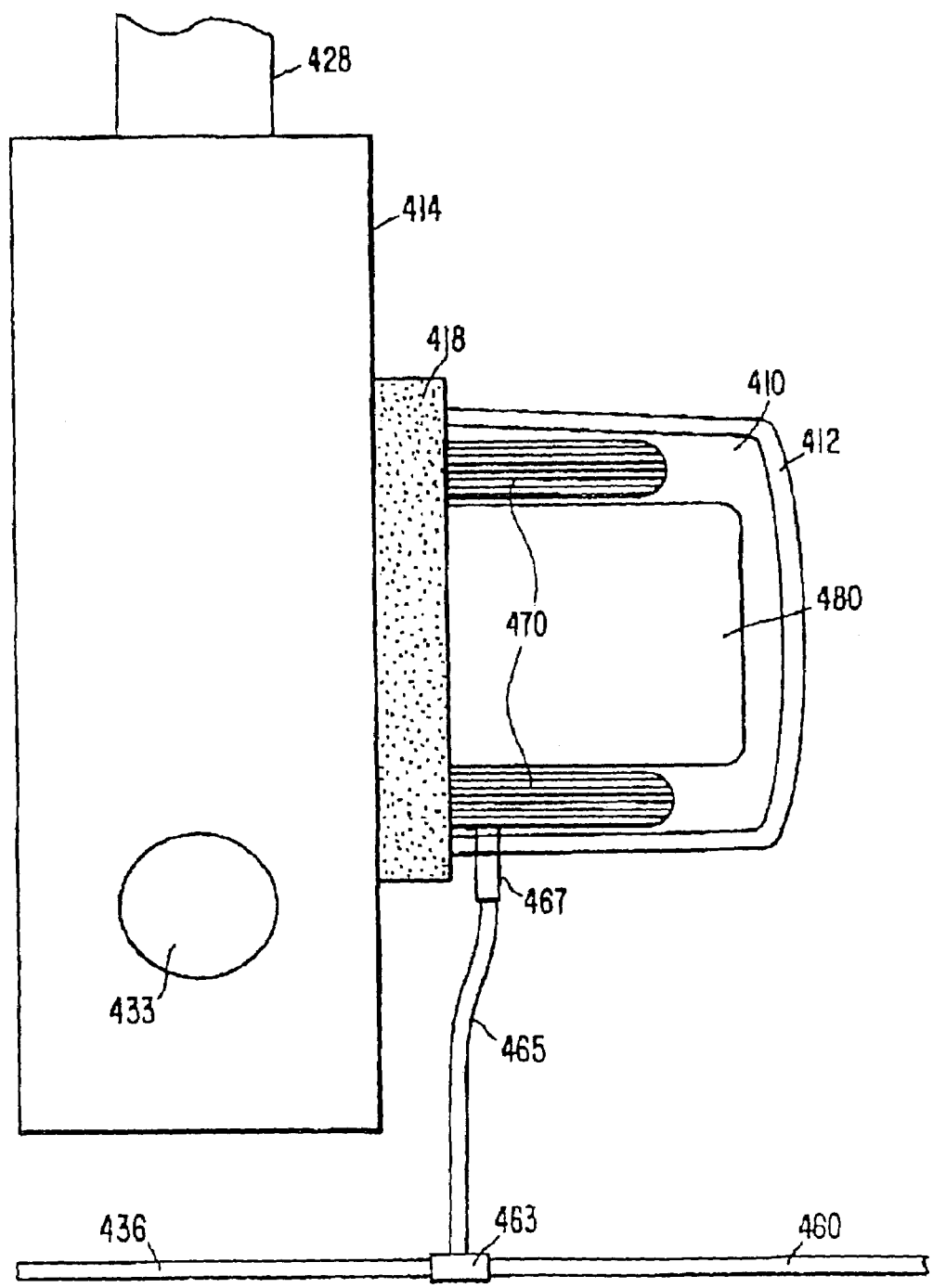
FIG. 4a shows a side view of a fourth embodiment of an electric meter according to the invention.
Figure 4B:
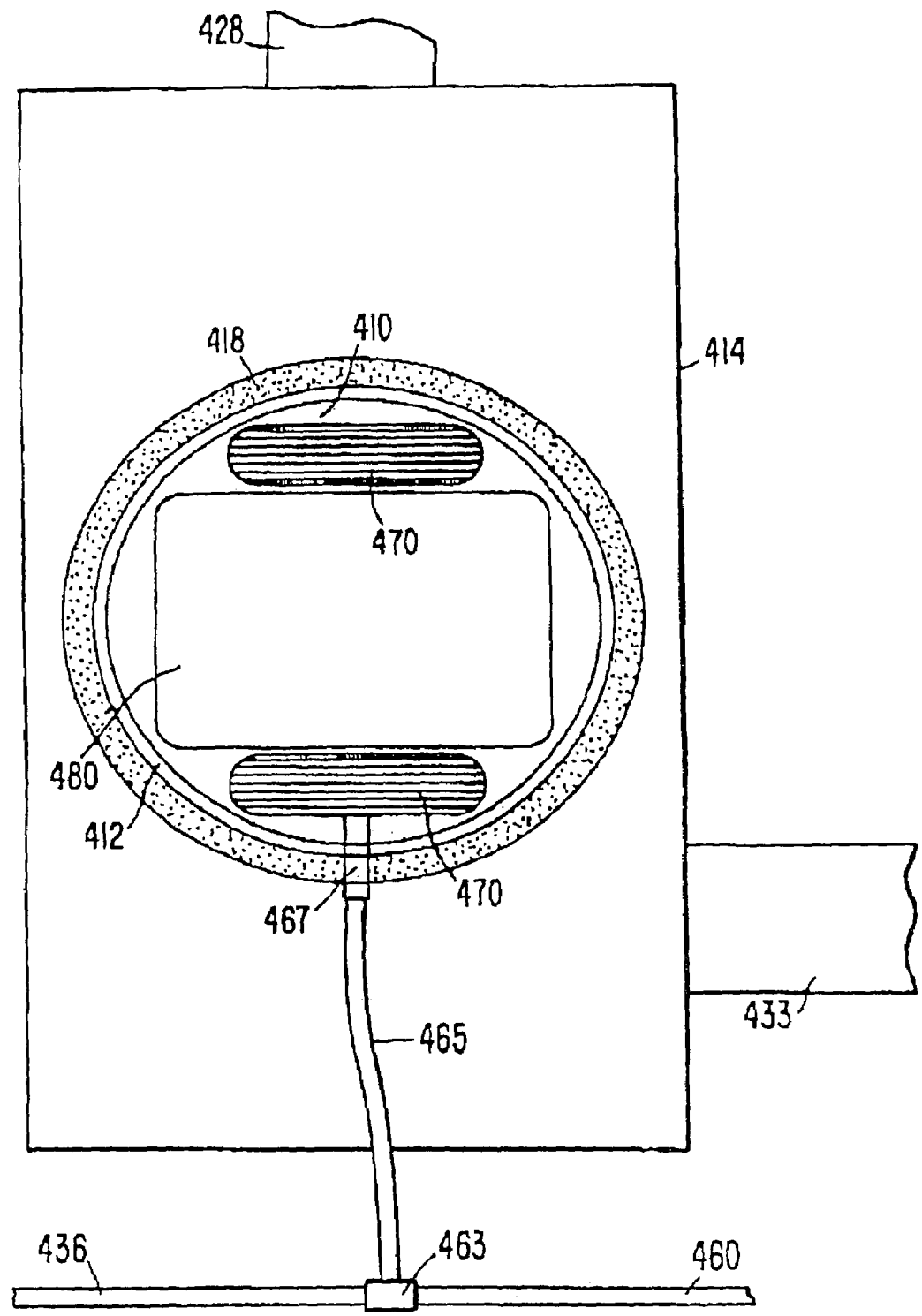
FIG. 4b shows a front view of the fourth embodiment of an electric meter according to the invention.

FIGS. 4a and 4b show a side and a front view, respectively, of a fourth embodiment of an electric meter 410 according to the invention wherein a connection is made to a communication line 460.

Electric meter 410 has a meter enclosure 412, which encloses standard electric power meter 480 and associated electronics 470. Meter enclosure 412 forms a seal with meter seal ring 418 to provide protection from the elements. Electric meter 410 is mated with standard meter box 414 and by the seal 418, is sealed to the meter box 414. External power lines 428 enter the sealed meter box 414 from the top (or any angle or direction) and power is supplied to a house through a power conduit 433 which is shown exiting the meter box 414 from the side.

Associated electronics 470 are coupled to communication line 460 through a cable 465. Electric meter 410 provides a stress relief 467 for cable 465. Cable 465 is coupled to communication line 460 at connection point 463. Signals are communicated in the house over internal cable 436 or by power lines 332.

According to the fourth embodiment, communication line 460 comprises, for example, a coaxial cable, a fiber optic cable, or a twisted pair telephone line. In the case of a coaxial cable, connection point 463 may be a simple coaxial "T" connection. Connection point 463 may otherwise be a "splice" type connection wherein signals on communication line 460 are passed directly onto internal cable 436 in addition to being processed by associated electronics 470 over cable 465.

For example, communication line 460 may deliver conventional television signals to the house, some of which are scrambled. The conventional signals could be delivered directly to the house for reception on a conventional TV. Concurrently, via a "T" connection, associated electronics may process the scrambled television signals and deliver de-scrambled television signals over the house's internal power lines for reception by a remote device plugged into an electrical wall outlet. The remote device would put the de-scrambled signals back on conventional television coaxial cable or conventional video and audio cables for reception on the TV. Alternatively, the associated electronics may shift and superimpose the de-scrambled television signal onto internal cable 436 for reception on the conventional TV.

The data port according to the invention can provide numerous advantageous applications to the user. For example, the user can request information regarding the user's utility usage and bill. The user may utilize the data port according to the invention to pay the utility bill and other bills via credit card or other payment arrangements.

Another example is information access. The data port according to invention could provide a personal computer for the user. The personal computer can be interfaced to the user's home electronics and appliances. The personal computer may have access to various interactive computer services. For example, the user can utilize the data port according to the invention to access the Internet and other information sources. The user could use their home television set as a display. The electric company may also provide computer software and games for use on the personal computer.

Both the electric company and the user could use the data port according to the invention advantageously for load management. The electric company could, for example, suspend electric service to non-essential circuits, such as hot water heaters, during peak demand times. The user could, for example, arrange to have the dishwasher run during lower rate hours. The electric company could also use the data port according to the invention for remote meter reading and also for detection of tampering by, for example, determining unusual power usage.

The data port according to the invention can also detect power outages and other problems with the electric company's distribution system. The PC interface 398 may be programmed to calculate the harmonic distortion in the power line using fast Fourier analysis. Returning this calculation to the power company via network interface 362 can enable the company to either correct the power factor or, when appropriate, to charge higher fees when the home owner or power user is creating excessive electrical noise.

Alternatively, the device may be employed to change thermostat settings for air conditioning, heat and hot water functions in the house 330 as a function of changes in the cost and/or availability of electric power. Power costs have recently gone as high as $500 to $1,000 per kilowatt-hour at times of reduced generation capacity. In order to effect such changes, the utility would transmit to the device the current cost of power, which would then be compared to predetermined thresholds set by the home owner by the PC interface 398. The amount of the change in thermostat settings could be set as a function of the current cost of a kilowatt-hour. The house owner is able to choose different ranges of thermostat settings at times of reduced generation capacity depending on the cost of electrical power. Changing thermostats is a much better way for the utility to shed load than cutting power to whole regions of the city.

The data port according to the invention provides a further advantage of being able to monitor and collect data on the television viewing habits of the user. Safeguards will insure that this information is only available if the homeowner authorizes it. Likewise, the data port could be used as the means for voting or census taking. Such information can be collected at the home and communicated over the communication network. For example, viewing habit information may be collected by the video processor 390 and stored on the hard disk 399 by the PC interface 398, and transmitted to the electric company upon request. Such information is useful to determine the size of the viewing audience for various different television programs. Likewise, voting, census or other information could be collected in the house 330 using a television remote control or other input device.

The data port according to the invention could be used for interactive instructional programs in the home. An instructional program could be viewed on the user's television set and the user could, for example, use a remote control device to respond to multiple choice questions posed by the instructional program.

Other advantages include the ability for the electric company to provide video signals, such as pay-per-view programs, to the user. The signals may be scrambled at the point of distribution and de-scrambled by the data port according to the invention. The electric company may also provide connection to various local and long distance telephone services through the data port according to the invention.

A particularly advantageous use of the data port according to the invention includes monitoring a personal medical alert device worn by a user inside the home. Such a device may, for example, transmit medical data on a periodic basis and be relayed to a physician through the data port according to the invention. For example, the device could transmit information by way of a wireless connection to the house power lines, for retransmission to the utility company via PC interface 398. Alternatively, such a device may be activated by the user to alert emergency medical services through the data port according to the invention. A similar advantage can be achieved to monitor movements of a user restricted to their homes by, for example, a court order. Computer 370 may include a processor or means 351 for detecting a satellite identified location of the personal medical alert device or other such device using, for example, network wireless transmission 361 which includes satellite communications. Computer 370 also may be configured to detect security breaches in sealed data ports (e.g. network interface 272, which is configured as a firewall).

As noted above, the data port according to the invention can transmit and or receive information from digital and analog networks directly over the power lines 128. Any of the several well-known techniques for using power lines to transmit digital or analog information into the home may be employed. For example, Dr. Sanderson has described a system for distribution of broad band multi-media services over the high-voltage cables of a power distribution network (U.S. Pat. No. 6,040,759), the disclosure of which is incorporated herein, and this patent includes other references to power line carrier technology.

FIGS. 5a-5e illustrate various arrangements for placement of the multifunction data port attached to or placed within a utility meter. Thus, in FIG. 5a, an embodiment of the invention where a multifunction data port 570 is located between the utility meter 510 and the meter box 514, via meter seal rings 418. The multifunction data port 570 is coupled to a communication line through stress relief 567 and cable 565.

Figure 5A:
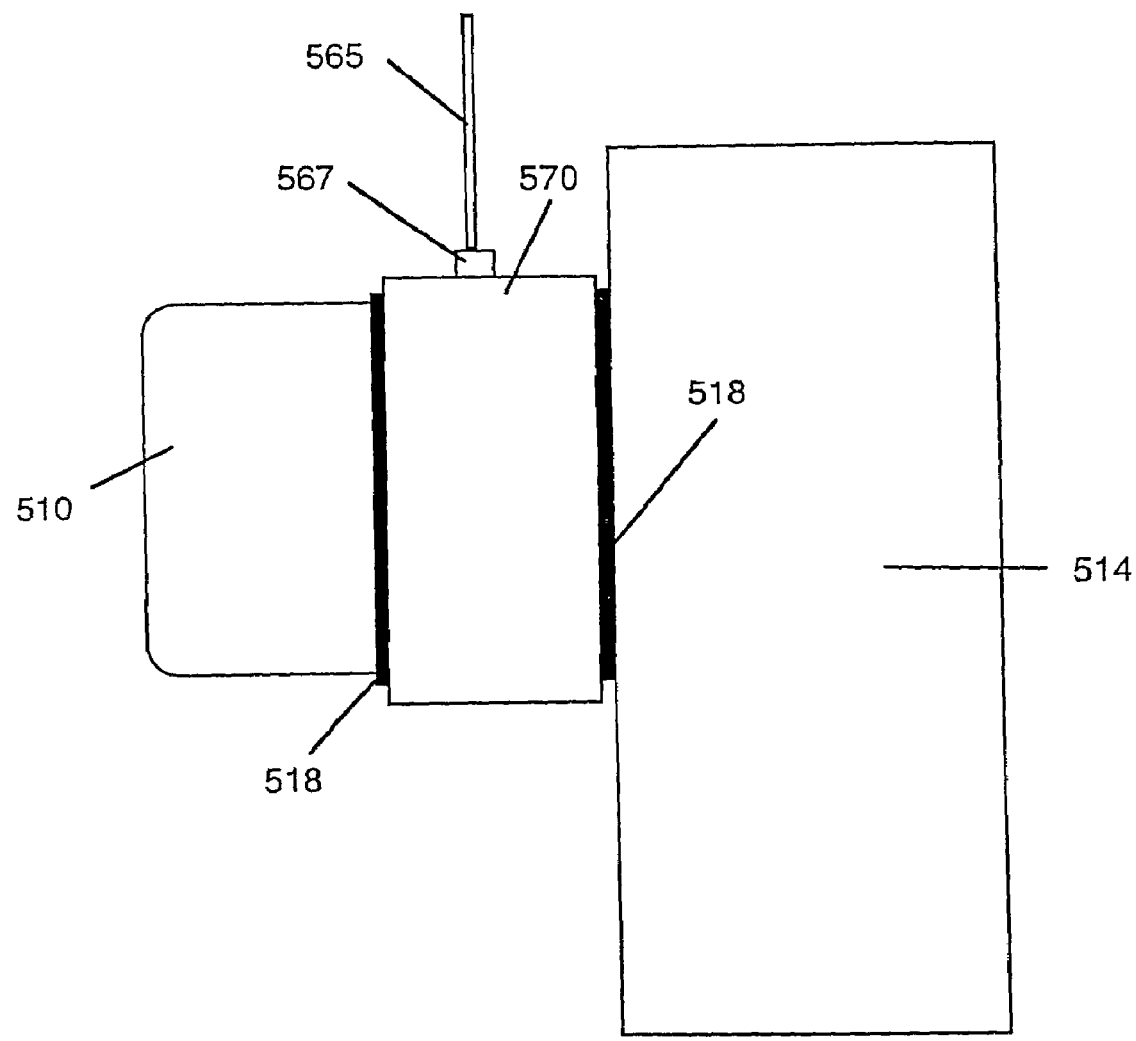
FIG. 5a shows a side view of an embodiment of the invention with a multifunction data port located between the utility meter and the meter box.
Figure 5B:
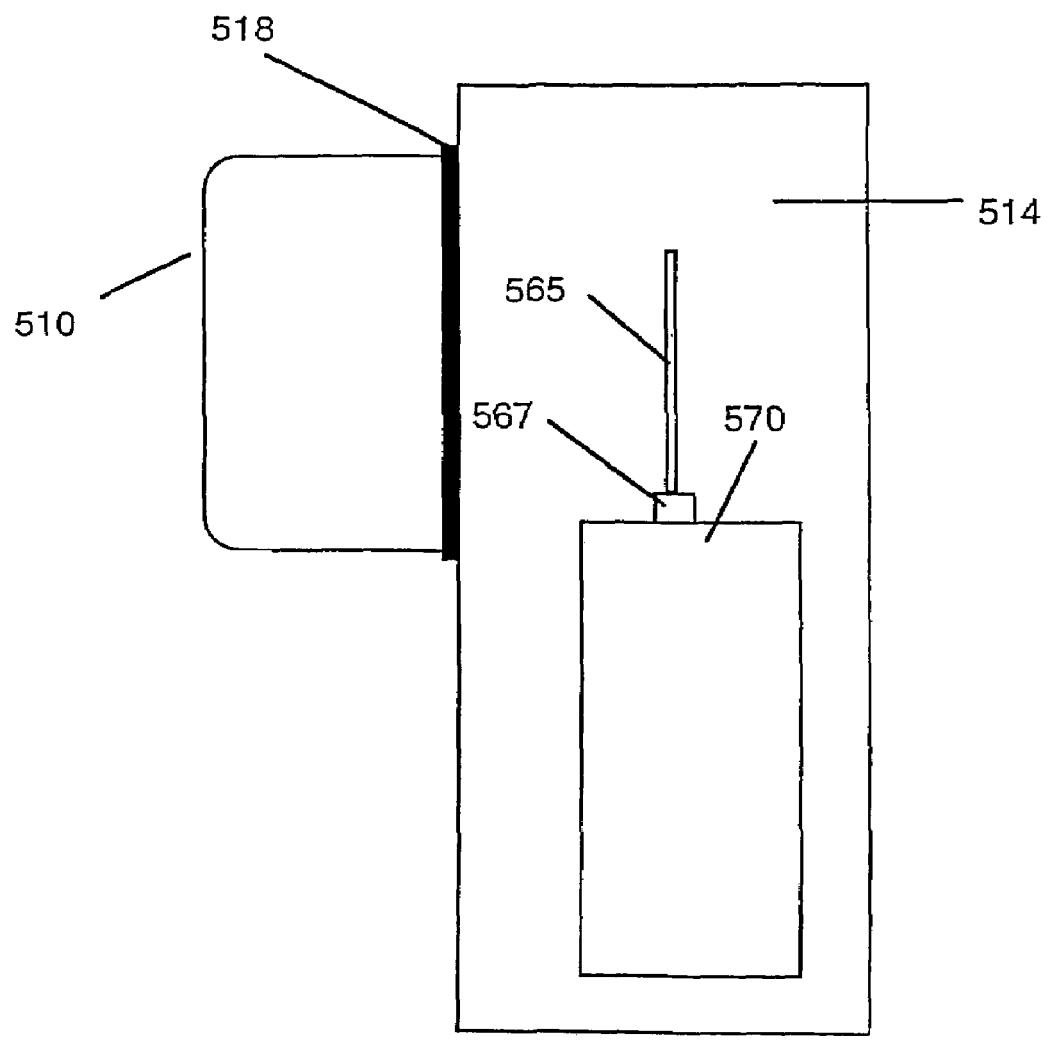
FIG. 5b shows a side view of an embodiment of the invention with the utility interface apparatus or multifunction data port attached to the side of a meter box.
Figure 5C:
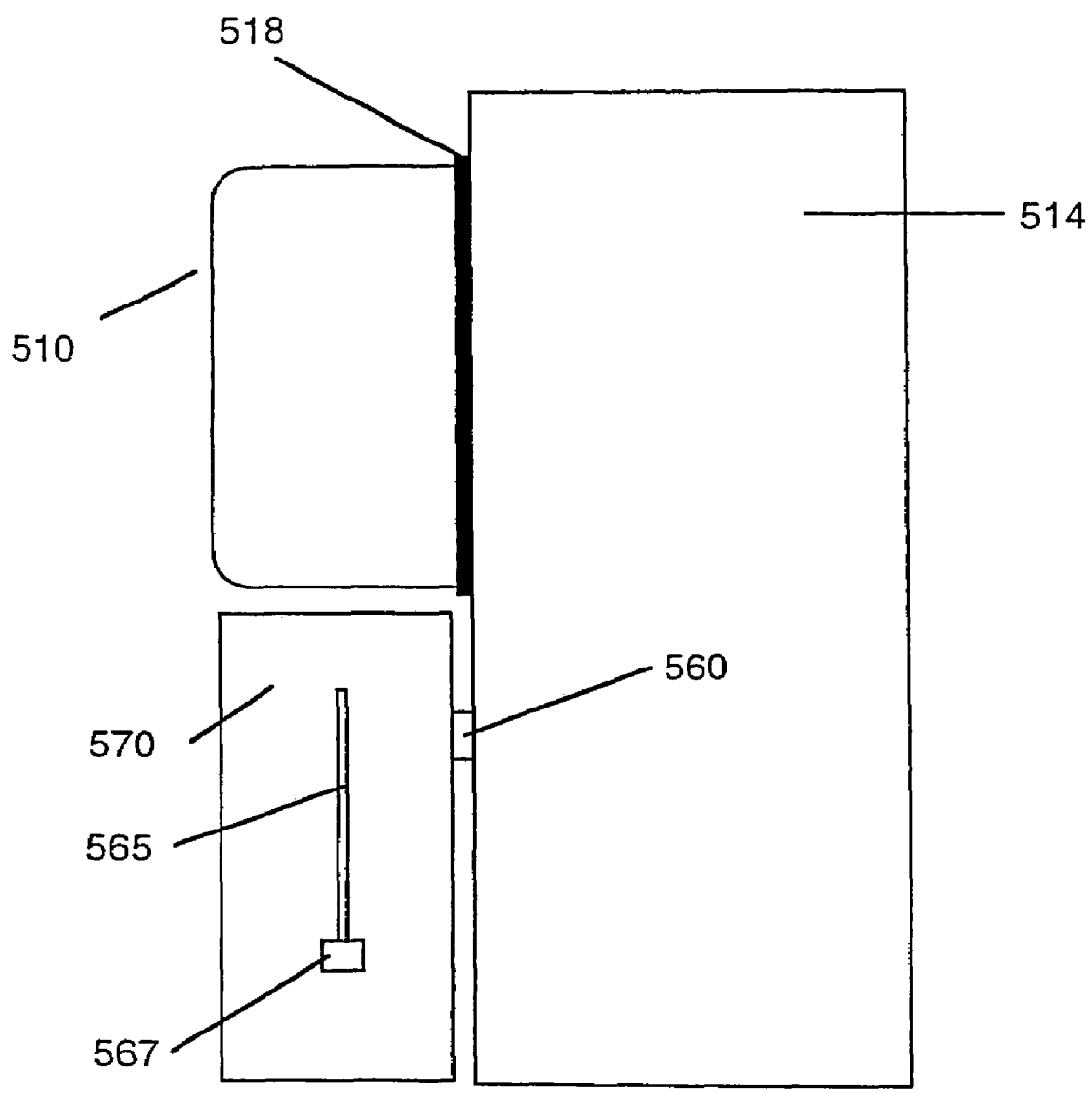
FIG. 5c shows a side view of an embodiment of the invention with the utility interface apparatus or multifunction data port attached to the front of a meter box.
Figure 5D:
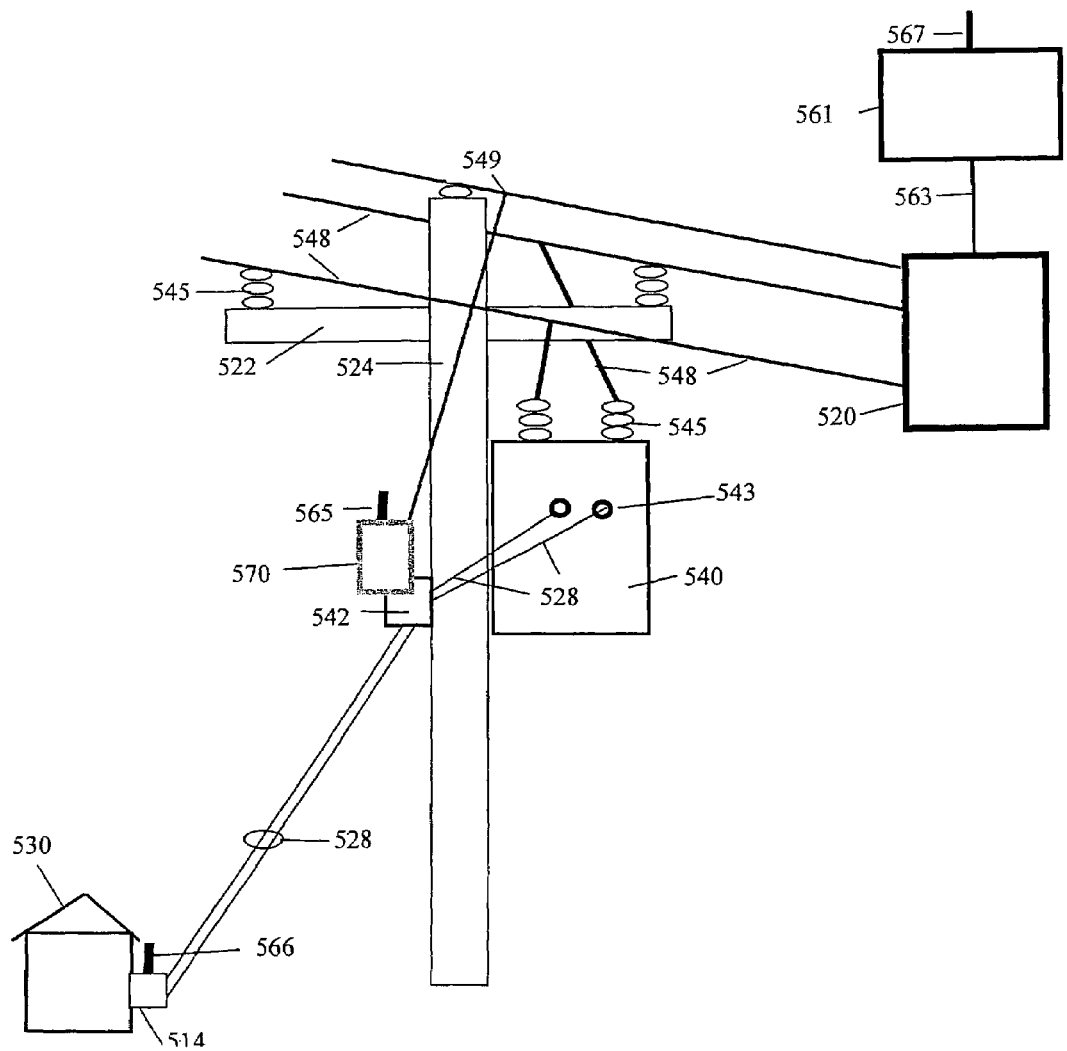
FIG. 5d shows a front view of an embodiment of the invention with the utility interface apparatus or multifunction data port attached to the side of a meter box.
Figure 5E:
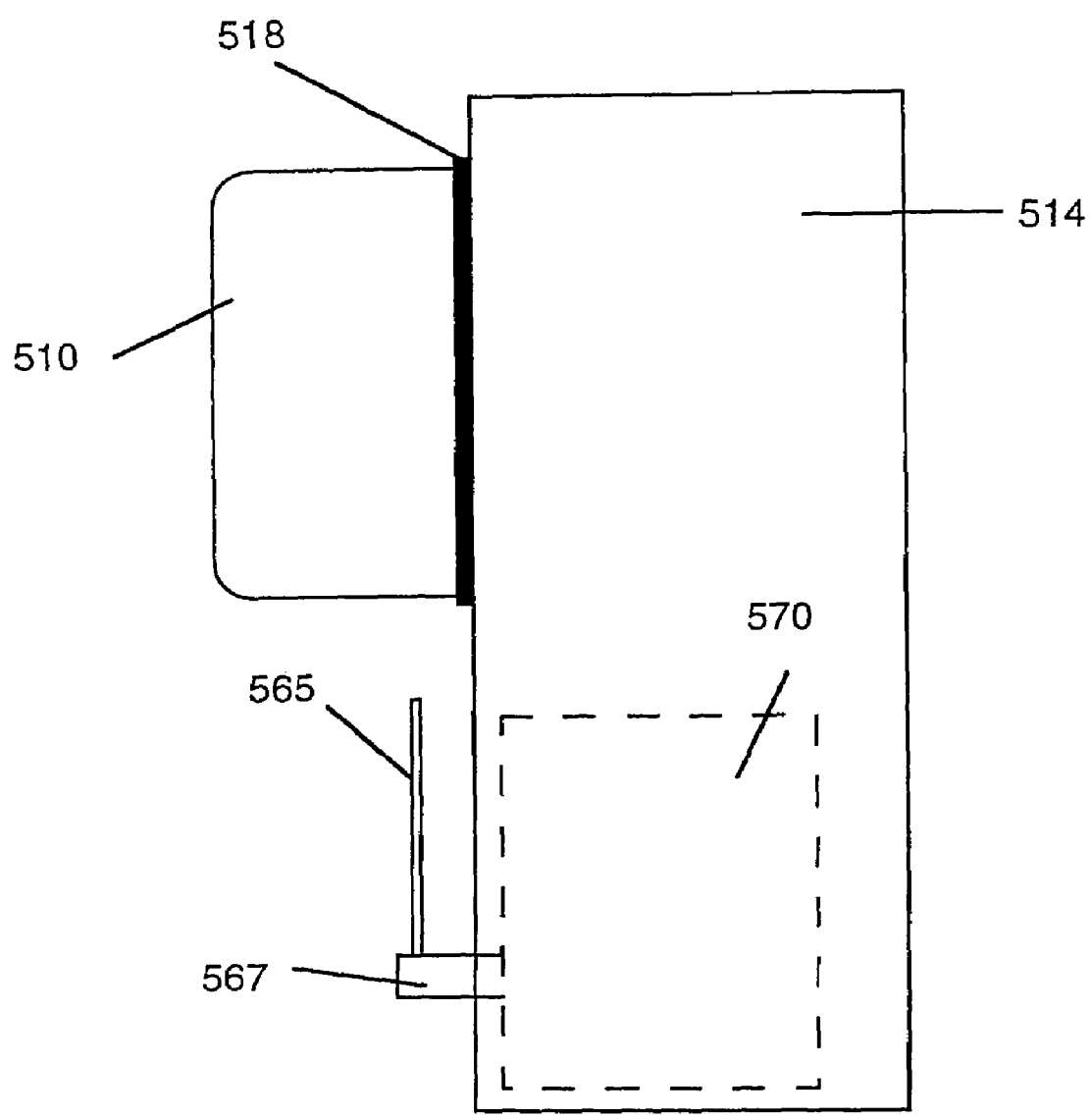
FIG. 5e shows a side view of an embodiment of the invention with a utility interface apparatus or multifunction data port located inside of the meter box.

In FIG. 5b, the utility interface apparatus or multifunction data port 570 is attached to the side of a meter box 514. In FIG. 5c, the utility interface apparatus or multifunction data port 570 attached to the front of a meter box 514. In FIG. 5d, the utility interface apparatus or multifunction data port 570 is attached to the side of a meter box 570. Finally, in FIG. 5e, the utility interface apparatus or multifunction data port 570 located inside of the meter box 514.

Figure 6:
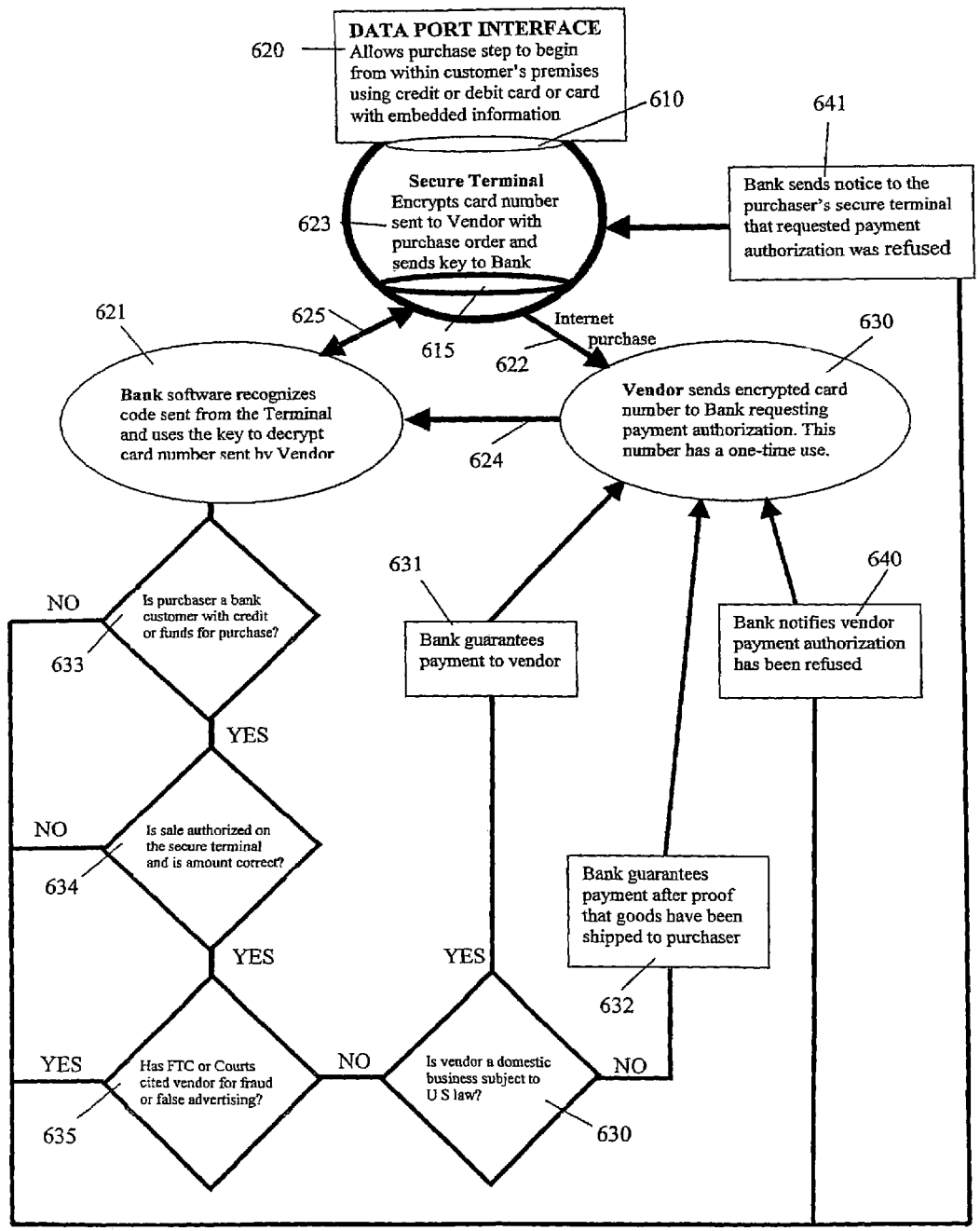
FIG. 6 shows a flow diagram of an embodiment of an electric meter interface apparatus according to the invention providing a secure terminal for financial transactions.

Referring next to FIG. 6, a sixth embodiment of the present invention is illustrated, with the data port being used to facilitate secure banking and Internet transactions. As noted above, the data port may be used in connection with a home based input device, such as a television remote control, to enable communication between the electric company and the homeowner. Using a remote control, a wireless keyboard or other input devices (not shown) that are linked to a house electric lines 332, the present invention likewise permits a homeowner to conduct secure banking and Internet purchasing.

FIG. 6 is a flow diagram illustrating the steps of a method to conduct secure banking and Internet purchasing using the data ports. A purchaser 620 who wishes to conduct such business may use the data port, acting as a secure terminal 623, to contact his or her bank 621. At step 650, computer 370 monitors the security of the sealed data port (e.g., sealing and/or network interface firewalls) for any breaches. When a home owner initiates a banking transaction, PC interface 398 will transmit only the data port serial number, and not an initial or public encryption key, to the appropriate bank or other financial institution via the communications network 625. In turn, the bank would be the only institution, which has a look up table to associate the data port serial number with the initial or public key number. The bank, of course, will also have the private key required to ultimately decode the message. In this way, a thief would have to not only have to break to the private key to decrypt the financial transaction, but would also need to gain access to the serial number/public key table that is only held by the financial institution 621.

Returning to FIG. 6, when a purchaser 620 transmits their credit or debit card information over the Internet 622 to a vendor 630 to make a purchase, the vendor will ordinarily contact the bank that issued the credit card 621 to verify the transaction. The bank then checks to determine whether the purchaser has sufficient funds to conduct the transaction 622. In accordance with the present invention, in order to verify that the purchase has originated from the homeowner's secure terminal 623 the bank can also send a query 625 to the home owner's data port 623. If sufficient funds are lacking 633, or the purchase authorization 634 was not on the secure terminal 623, the bank 621 notifies the vendor 630 that payment has been refused 640 and informs the purchaser 620 the reason that the bank 621 refused payment authorization 641.

In addition, bank 621 has the option 635 to check if the vendor is not trustworthy, e.g., because it is a suspect company, or the option 636 to check if the vendor is not a domestic business subject to U S laws, in which event additional purchase authorization requirements may be imposed 632. Options 635 and 636 may be exercised sequentially. First exercising option 635, bank 621 may find that the vendor is untrustworthy (untrustworthy=YES), then bank 621 may refuse authorization (641). If the vendor is trustworthy (untrustworthy=NO), bank 621 may then exercise option 636 to check if the vendor is or is not a domestic business subject to U S laws. If vendor 630 is subject to US domestic laws, bank 621 may promptly guarantee payment to the vendor (631). If vendor 630 is not subject to US domestic laws, bank 621 may require proof that vendor 630 has shipped the goods to the purchaser before guaranteeing payment (632).

Only when all safeties are met will the bank 621 guarantee payment to the vendor 6301 and the transaction consummated 631. In this way, the purchaser 620 is offered additional consumer protection to prevent transactions initiated by a third party has gained access to his or her credit card information or in dealings with potentially troublesome vendors.

FIG. 7 shows the use of the invention to sub-meter electrical power and to provide computer services and Internet access to apartment building and commercial complexes 700. This invention can be a way to bridge the "digital divide" and bring computer services and access to the Internet for transient populations and low income groups, with all of the benefits to the consumer, the utility and the telecommunication The owner of the commercial or residential complex 700 can contract with the utility for wholesale electric power delivered by the power line 710 to the master meter 705 and then distributes this power over the internal lines 715 to each sub meter 745 in the complex 700. Each sub-meter 745 and the multifunction data port 735 are attached under seal (not shown) in the sub meter box 740. The data port 735 is identified as Datapump Gateway®, which is one of the registered trademarks for the device; Gateway Meter® is a second trademark. The landlord also can obtain broad band data access to the Internet and digital data via the external signal access connection 720, which can be wireless, OC1, T1, DSL, coax cable or direct fiber, or by any combinations of connections through any technologies or spectra as outlined herein. The internal Internet Router 725 sends this digital data over the internal signal lines 730 to the individual multifunction data ports 735 located in each unit. The internal signal lines 730 can be optic fiber, wireless, twisted pair telephone lines etc. or they can represent use of the internal power lines 715 for data distribution and Internet access.

The electric meter box 740 is a secure sealed location with power. Location of the computer and data port in this location helps to insure that this invention will remain with the property when the tenant moves and that the data port will always available for use. The landlord can offer additional services to apartment tenants. This feature can be used in apartments, commercial buildings, public and military housing to provide the following:
1. Data port for telecommunications
2. Education and Internet access
3. A secure terminal for e-Banking and e-Commerce
4. Job services and job training.
5. Medical monitoring and home care.
6. Time of use electric rates
7. Computer technology
8. Descrambler for video and MPEG 2.
9. Communication and public safety
10. Controller for internal appliances Additional advantages and modifications will readily occur to those skilled in the art. For example, an alternative arrangement might include having the associated electronics located in a junction box on the utility pole or in another external location. While the foregoing embodiments have been described with reference to a house, one skilled in the art will appreciate that the invention is applicable to other residential and commercial structures.

Therefore, the invention in its broader aspects is not limited to the specific details, and representative devices, shown and described herein. Accordingly, various modifications may be made without departing from the spirit or scope of the general inventive concept as defined by the appended claims and their equivalents.

I claim:

1. A method for detecting power problems with a utility provider distribution system using a multifunction data port, the multifunction data port comprising a plurality of interfaces for connecting to a utility user's premises and a communication network, the method comprising:
    a) installing the multifunction data port at the utility user's premises, the utility user's premises are connected to utility user's electric power lines and to the Internet, the multifunction data port comprising an embedded computer, a network interface, and a house interface;
    b) configuring the computer to provide communication interface between the communication network and devices located within the utility user's premises;
    b) using the computer for continuously obtaining power measurements including Voltage and current data on the utility user's electric power lines in real time;
    c) storing the obtained power measurements in the computer;
    d) using the computer to calculate the harmonic distortion data in the power line using fast Fourier analysis;
    e) transmitting the calculated data from the computer to the utility provider via network interface;
    f) based on the calculated data, determining whether the utility user is responsible for creating excessive electrical noise;
    g) charging the user higher fees when it is determined that the utility user is responsible for creating the excessive electrical noise.

2. The method as recited in claim 1, further comprising the step of configuring the computer to communicate at least one of utility usage, billing information, and payment information corresponding to the utility user over the communication network.

3. The method as recited in claim 2, further comprising:
    initiating a secured transaction from the multifunction data port;
    transmitting a multifunction data port serial number corresponding to the multifunction data port as part of the initiated secured transaction to a financial institution over the communications network;
    associating the multifunction data port serial number with a unique initial key number;
    verifying the identity of the multifunction data port.

4. The method as recited in claim 1, further comprising the step of configuring the computer to display at least one of utility usage information, billing information, and payment information on a television located within said utility user's structure.

5. The method as recited in claim 1, further comprising the step of configuring the computer to provide interactive access to digital information services over the communication network.

6. The method as recited in claim 1, further comprising the step of configuring the computer to provide load management capability to the utility user.

7. The method as recited in claim 1, further comprising the step of configuring said computer to provide load management capability to the utility provider.

8. The method as recited in claim 1, further comprising the step of configuring the computer to provide an interface with peripheral computing devices located within the utility user's premises, whereby the computer and the peripheral computing devices operate as a personal computer.

9. The method as recited in claim 8, further comprising the step of configuring the computer to monitor television viewing of the utility user within the utility user's structure and to report information related to said television viewing over said communication network.

10. The method as recited in claim 1, further comprising the step of configuring the computer to communicate a detection of at least one of a tampering of the multifunction data port, a power outage at the utility meter, and a power distribution problem over the communication network.

11. The method as recited in claim 10, further comprising the step of
    (a) inputting data within the utility user's premises;
    (b) transmitting said data from within the user's premises to the multifunction data port connected between the communications network and the utility user's premises;
    (c) detecting whether any breaches in the multifunction data port have occurred; and
    (a) transmitting the data from the multifunction data port to the utility provider only if no breaches are detected.

12. The method as recited in claim 11, wherein the step of inputting data within a utility user's premises further comprises browsing the Internet.

13. The method as recited in claim 11, wherein the step of inputting data within a utility user's premises further comprises telecommunication.

14. The method as recited in claim 11, wherein the step of inputting data within a utility user's premises further comprises video communication.

15. A multifunction data port for detecting power problems with a utility provider distribution system using a multifunction data port, comprising:

a utility meter for measuring utility usage, the utility meter having a housing;
a computer located in the housing and coupled to said utility meter,
a network interface for connecting the computer to a communication network; and
a house interface for connecting the computer to devices located internal to a utility user's premises, wherein the computer is configured to:
provide communication interface between the communication network and devices located within the utility user's premises;
continuously obtain power measurements including Voltage and current data on the utility user's electric power lines in real time;
store the obtained power measurements in the computer;
calculate harmonic distortion data in the power line using fast Fourier analysis;
transmit the calculated data from the computer to the utility provider via the network interface;
charge the user higher fees when it is determined that the utility user is responsible for creating excessive electrical noise.

16. The multifunction data port as recited in claim 15, wherein the computer is further configured to communicate at least one of utility usage, billing information, and payment information corresponding to the utility user over the communication network.

17. The multifunction data port as recited in claim 16, wherein the computer is further configured to:
initiate a secured transaction from the multifunction data port;
transmit a multifunction data port serial number corresponding to the multifunction data port as part of the initiated secured transaction to a financial institution over the communications network;
associate the multifunction data port serial number with a unique initial key number;
verify the identity of the multifunction data port.

18. The multifunction data port as recited in claim 15, wherein the computer is further configured to display at least one of utility usage information, billing information, and payment information on a television located within said utility user's structure.

19. The multifunction data port as recited in claim 15, wherein the computer is further configured to provide interactive access to digital information services over the communication network.

20. The multifunction data port as recited in claim 15, wherein the computer is further configured to provide load management capability to the utility user.

21. The multifunction data port as recited in claim 15, wherein the computer is further configured to provide load management capability to the utility provider.

22. The multifunction data port as recited in claim 15, wherein the computer is further configured to provide an interface with peripheral computing devices located within the utility user's premises, whereby the computer and the peripheral computing devices operate as a personal computer.

23. The multifunction data port as recited in claim 22, wherein the computer is further configured to monitor television viewing of the utility user within the utility user's structure and to report information related to said television viewing over said communication network.

24. The multifunction data port as recited in claim 15, wherein the computer is further configured to communicate a detection of at least one of a tampering of the multifunction data port, a power outage at the utility meter, and a power distribution problem over the communication network.

25. The multifunction data port as recited in claim 15, wherein the computer is further configured to the computer is further configured to:
(a) input data within the utility user's premises;
(b) transmit the data from within the user's premises to the multifunction data port connected between the communications network and the utility user's premises;
(c) detect whether any breaches in the multifunction data port have occurred; and
(a) transmit the data from the multifunction data port to the utility provider only if no breaches are detected.

26. The multifunction data port as recited in claim 25, wherein the computer is further configured to input data within the utility user's premises via browsing the Internet.

27. The multifunction data port as recited in claim 25, wherein the computer is further configured to input data within the utility user's premises via a means for telecommunication.

28. The multifunction data port as recited in claim 25, wherein the computer is further configured to input data within the utility user's premises via a means for video communication.

* * * * *